United States Patent [19]

Haas, Sr. et al.

[11] Patent Number: 4,524,682
[45] Date of Patent: Jun. 25, 1985

[54] APPARATUS FOR CONDITIONING WAFERS

[75] Inventors: Franz Haas, Sr., Vienna; Franz Haas, Jr., Leobendorf; Johann Haas, Klosterneuburg, all of Austria

[73] Assignee: Franz Haas Waffelmaschinen Industriegesellschaft m.b.H., Vienna, Austria

[21] Appl. No.: 558,936

[22] Filed: Dec. 7, 1983

[30] Foreign Application Priority Data

Dec. 23, 1982 [AT] Austria .................................. 4678/82

[51] Int. Cl.³ .................................................. A23B 4/04
[52] U.S. Cl. ........................................ 99/477; 99/485; 426/524
[58] Field of Search .................. 99/477, 467, 478, 470, 99/479, 373, 443, 485, 483, 484, 372; 426/524

[56] References Cited

U.S. PATENT DOCUMENTS

| | | | |
|---|---|---|---|
| 2,750,875 | 6/1956 | Finlayson | 99/373 |
| 3,855,912 | 12/1974 | Schoonmaker | 99/467 |
| 3,961,569 | 6/1976 | Kenyon | 99/470 |
| 3,972,279 | 8/1976 | Powers | 99/470 |
| 4,029,004 | 6/1977 | Isenberg | 99/477 |
| 4,417,508 | 11/1983 | Haas | 99/373 |

Primary Examiner—Robert W. Jenkins
Attorney, Agent, or Firm—Kurt Kelman

[57] ABSTRACT

Apparatus for conditioning wafers, such as wafer sheets, flat wafers, low hollow wafers and the like comprises an insulated conditioning chamber, which is closed except for a feed opening and a discharge opening, a revolving conveyor, which extends in the conditioning chamber adjacent to the feed opening and the discharge opening and is provided with successive compartments for receiving wafers, and air-guiding passages, which extend along the path of the compartments and are connected to an air-conditioning plant, which is preferably disposed outside the conditioning chamber. The clearance between the supporting elements which have been moved or swung toward each other is substantially one to 5 times, preferably 1.1 to two times, the wall thickness of a flat wafer or once to twice the height of a low hollow wafer. At least one of the two supporting elements rises above the received wafer at least with a projecting portion.

42 Claims, 16 Drawing Figures

APPARATUS FOR CONDITIONING WAFERS

This invention relates to apparatus for conditioning wafers, such as wafer sheets, flat wafers, low hollow wafers and the like, comprising an insulated conditioning chamber, which is closed except for a feed opening and a discharge opening, a revolving conveyor, which extends in the conditioning chamber adjacent to the feed opening and the discharge opening and is provided with successive compartments for receiving wafers, and air-guiding passages, which extend along the path of the compartments and are connected to an air-conditioning plant, which is preferably disposed outside the conditioning chamber.

In known apparatus of that kind for conditioning wafer sheet, each compartment consists of a space between two rectangular U-shaped members, which are arranged one behind the other and each of which is secured to a separate carrying element of the conveyor. The length of each compartment measured in the direction of travel of the conveyor is determined by the clearance between two consecutive U-shaped members. That clearance is determined by the design of the conveyor because the width of the carrying elements, measured in the direction of travel, must not be less than a lower limit that is determined by the length of the links of the chains by which the carrying elements are connected. Such clearance will also depend on the air stream, which flows transversely to the direction of travel and must adequately contact the wafer sheets received in the compartments so that a conditioning can be effected.

The baked wafer sheets are conditioned in order to relieve them from stresses and to effect a controlled and uniform enrichment of moisture in the wafer sheet. The moisture in the wafer sheet is enriched to ensure that in certain products, such as chocolate-coated wafers or in wafers filled with a moisture-containing material, the wafer is not so dry that the coating material will crack open or that the wafer sheet will separate from the filling material.

The absorption of moisture increases the size of the wafer sheet. As the wafer sheets leaving the wafer-baking oven differ in baked structure and in moisture contents, that increase in size results in a non-iniform absorption of moisture and in a strong warping of the wafer sheet because the wafer sheet is loosely held in the associated compartment and is not restricted in its movements which are due to internal stresses. The absorption of moisture will also depend on the accuracy with which the humidity of the air used to condition the wafer sheets is controlled. The warping of the wafer sheet gives rise to problems during the coating of the wafer sheet with cream and during a formation of blocks in which the cream-coated side of one wafer sheet contacts the uncoated side of another wafer sheet. These problems range from the formation of a non-uniform cream layer on the wafer sheet to a breakage of the wafer sheet during an application of cream by a contact spreading process and affect also the assembling of the wafer sheets in the block-forming apparatus.

It is an object of the invention to eliminate these disadvantages and to provide apparatus in which a warping of the wafer sheets during their conditioning is prevented.

In apparatus of the kind described first hereinbefore this object is accomplished in accordance with the invention in that the elements which define the compartments for receiving respective wafer sheets consist of gridlike wafer-supporting elements, which are adapted to be moved or swung toward each other and extend over at least one-half of the surface area of a wafer which has been received in the compartment, that the clearance between the supporting elements which have been moved or swung toward each other is substantially one to 5 times, preferably 1.1 to two times, the wall thickness of a flat wafer or once to twice the height of a low hollow wafer, and that at least one of the two supporting elements preferably rises above the received wafer at least with a projecting portion.

That design affords the advantage that each wafer, whether it consists of a wafer sheet, a flat wafer, a low hollow wafer or the like, is received in a compartment which in the direction of travel of the conveyor has such a length, determined by the clearance between the supporting elements, that a warping of the wafer in excess of a predetermined extent will be prevented during the conditioning process whereas the access of conditioning air to every point of the wafer will not be obstructed so that a uniform moisture content throughout the entire surface of the wafer will be obtained. In the arrangement according to the invention the spacing of the compartments can be selected as desired for each compartment and that spacing will not affect the position of the wafer in the compartment and the extent to which the wafer can warp. This is different from the known apparatus, in which two consecutive compartments are separated only by the thickness of the U-shaped member which is disposed between and defines the two compartments. In the arrangement according to the invention the spacing of the compartments can be optimally selected with a view of the conditioning requirements.

According to a further feature of the invention, the two supporting elements defining a compartment are carried by a single carrying element of the conveyor and at least one of said two supporting elements is hinged or movably mounted on the carrying element. The compartment is then opened and closed by means of cams or the like, which engage the supporting elements and move the movable supporting element from a first position, in which the supporting element is resiliently held, to a second position, in which the supporting element is also resiliently held, and back. Both supporting elements may be hinged or displaceable and the supporting element or elements may be swung or displaced or moved against the force of one or more springs.

Another feature of the invention resides in that the two supporting elements defining a compartment are mounted on two consecutive carrying elements of the conveyor. In such an arrangement at least one of the two supporting elements of a compartment may be hinged to or movably mounted on the associated carrying element.

In such an arrangement the compartment can also be opened and closed in that the supporting element or elements is or are swung or displaced between two positions, in which the supporting element or elements is or are resiliently held, or in that the supporting element or elements is or are swung or displaced against spring force.

In accordance with another feature of the invention the two supporting elements defining a compartment are rigidly secured to two consecutive carrying elements of the conveyor and the two supporting elements are swung apart and toward each other in the regions in which the conveyor is reversed. In that case there is no need for separate means for opening and closing the compartments.

In accordance with a further feature of the invention the two adjacent supporting elements of two consecutive compartments are mounted on a common carrying element of the conveyor.

These two supporting elements may be individually and rigidly secured to the common carrying elements or may be mounted on a carrying frame, which is secured to the common carrying element. In accordance with a further feature of the invention, one of the two adjacent supporting elements associated with two consecutive compartments is rigidly secured to the common carrying element of the conveyor and the other of said two supporting elements is resiliently supported on the first-mentioned supporting element. In that design, the resilient mounting of one supporting element and the rigid mounting of the other supporting element associated with a compartment will ensure that both supporting elements contact the wafer disposed between said supporting elements so that such wafer will be optimally urged to and maintained in a planar shape during the conditioning process.

The two adjacent supporting elements of two consecutive compartments may be resiliently supported by a carrying frame, which is mounted on a common carrying element of the conveyor.

In accordance with a further feature of the invention each supporting element consists of juxtaposed rods, which preferably define a common plane and are secured to the carrying element of the conveyor. The cross-section of each rod and the relative position of the rods may be selected in view of the surface texture of the wafer. Said rods may extend at right angles to the carrying element or may extend parallel to the carrying element from a carrying rod, which extends at right angles to the carrying element.

In accordance with the invention, adjacent rods of a supporting element extending in a plane can be interconnected to form a U-shaped member.

In accordance with a further feature of the invention, each of said rods constitutes one leg of a U-shaped member, which has a second leg spaced from said one leg along said conveyor.

In accordance with a further feature of the invention, in apparatus for conditioning low hollow wafers each clearance between the rods of a supporting element equals the distance between adjacent ones of the flat webs which connect the hollow body portions of the hollow wafer. Additional rods may be provided for supporting the hollow body portions of the hollow wafer.

Also in accordance with the invention each supporting element consists of a frame and of a grid extending over said frame.

In accordance with a further feature of the invention at least one retaining element is connected to at least one of the two supporting elements defining a compartment and which protrudes above the received wafer toward the other supporting element and at least partly spans the compartment or the clearance between the two supporting elements. If the supporting elements rise above the received wafer, that retaining element may be mounted directly on one of the two supporting elements. A single, elongate retaining element may be provided. Alternatively, each of a plurality of spaced apart retaining elements may be secured to an associated supporting element. Retaining elements may be provided on both supporting elements defining a compartment; in that case the retaining elements mounted on the two supporting elements will be staggered and each of them will extend into a space between two opposite retaining elements.

If the wafer rises above the supporting elements, the retaining elements may consist of hooks, which protrude above the supporting elements.

In a preferred embodiment of the invention the retaining elements consist of hooks, which protrude from the leading supporting element and are angled opposite to the direction of travel.

These retaining elements prevent a slipping of the wafer out of a compartment when the same is inverted as it is moved along the conveyor. As a result, the entire travel of the conveyor and of the compartments in the conditioning chamber can be used to condition the wafers. The retaining elements will prevent the wafer from slipping out even in an embodiment of the invention in which the compartments are opened and closed during each reversal of the conveyor.

The invention will now be explained in more detail with reference to illustrative embodiments shown on the drawings, in which.

Figure 1:
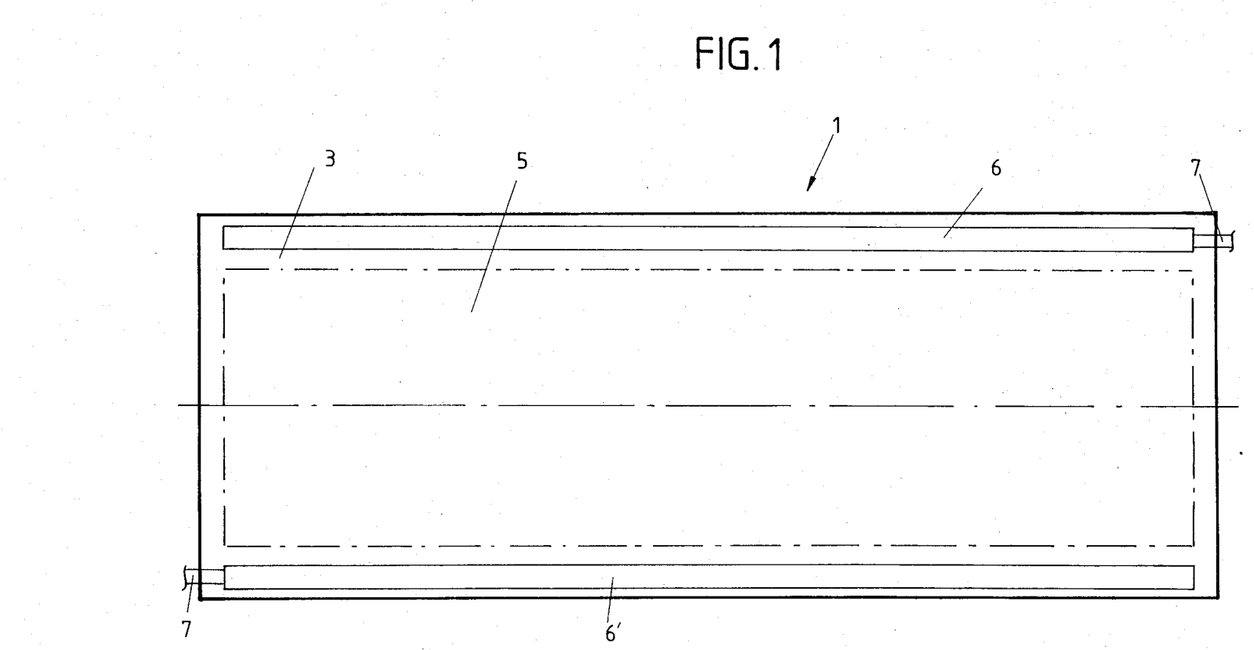
FIG. 1 is a schematic top plan view showing conditioning apparatus.

Apparatus 1 for conditioning wafers 2, such as wafer sheets, flat wafers, low hollow wafers or the like comprises a conditioning chamber 3, which is insulated, particularly heat-insulated, and contains a revolving conveyor 5, which carries compartments 4 for receiving wafers. In the conditioning chamber 3, air-guiding ducts 6, 6' extend beside the conveyor 5 along the path of the compartments 4 revolving with the conveyor 5 and have orifices, not shown, which face the compartments 4. The ducts 6, 6' are connected by respective fittings 7, 7' to an air-conditioning plant, not shown, which is disposed outside the conditioning chamber 3. Air from said plant is delivered to one of the ducts 6, 6', and is delivered through the orifices thereof in the form of air streams, which flow transversely to the direction of travel of the conveyor 5 through the spaces between the compartments 4 containing the wafers 2. Air from said air streams enters the orifices of the other of the ducts 6, 6' and is returned through the associated fitting 7 to the air-conditioning plant.

Figure 2:
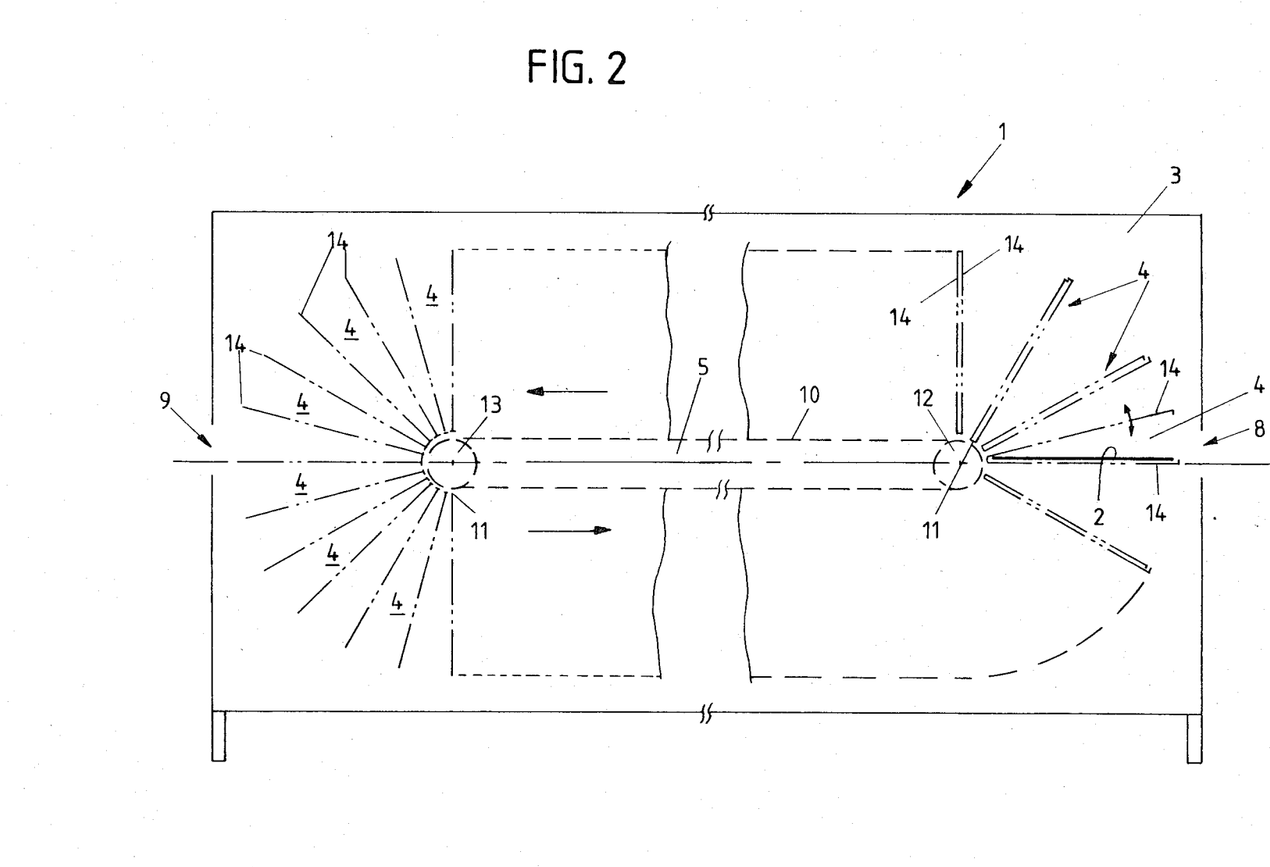
FIG. 2 is a schematic side elevation showing conditioning apparatus which in different halves comprises different compartments.

In the illustrative embodiment shown in FIG. 2 the conditioning chamber is provided at one end with a feed opening 8 for the wafers 2 and at the other end with a discharge opening 9 for the conditioned wafers. In this embodiment only the upper course of the conveyor 5 is used for the conditioning operation.

In an alternative embodiment, the feed opening and the discharge opening may be provided at the same end of the conditioning chamber 3 so that the upper and lower courses of the conveyor 5 are used to condition the wafers. In that case the entire conditioning chamber 3 is utilized and the compartments 4 receiving the wafers 2 are designed to prevent a falling of the wafers out of the compartments 4 when the latter are inverted.

The conveyor 5 consists of two revolving parallel conveyor chains 10, which are interconnected by carrying elements 11 and revolve around forward and rear reversing sprockets 12, 13. The conveyor chains 10 are driven by a motor and a chain drive, which are not shown and connected, e.g., to the shafts of the forward reversing sprockets.

Preferably planar, gridlike supporting elements are mounted in the carrying elements 11 of the conveyor. Each compartment 4 is defined by two supporting elements 14.

In a first illustrative embodiment, which is shown in the right-hand half of the conditioning apparatus represented in FIG. 2, both gridlike supporting elements 14 defining a compartment 4 are mounted on a single carrying element 11. One of the two supporting elements 14 is rigidly secured to the carrying element 11. The other supporting element is hinged to the carrying element 11. Adjacent to the feed opening and adjacent to the discharge opening, the hinged supporting element 14 defining the compartment 4 is reciprocated between a position in which the compartment 4 is closed and a position in which the compartment 4 is opened. The hinged supporting element 14 is resiliently held in each of said positions. When the compartment 4 is closed the two supporting elements 14 are parallel to each other and the clearance between them is only slightly larger than the thickness of the wafer 2 which has been received. Alternatively, the hinged supporting element which has been swung toward the other supporting element can be urged by spring force exerted by one or more springs, not shown, against the wafer 2 which has been received. In that case the clearance between the two supporting elements 14 will equal the thickness of the wafer.

In another embodiment of the invention, not illustrated, the hinged supporting element is hinged to a carrying element and is urged by springs against the other supporting element, which is rigidly secured to an adjacent carrying element.

In the illustrative embodiments described hereinbefore, the hinged supporting element may be replaced by a supporting element which is adapted to be displaced and reciprocated relative to the fixed supporting element and is displaced along tracks, e.g., against the force of one or more springs.

In a further embodiment, which is diagrammatically shown in the left-hand half of FIG. 2, the two supporting elements 14 defining a compartment 4 are also mounted on two adjacent, consecutive carrying elements 11 of the conveyor 5. In that embodiment the planar supporting elements 14 are rigidly connected to the associated carrying elements 11 and the clearance between the two supporting elements 14 when they have been swung toward each other is substantially as large as or slightly larger than the wall thickness of a conditioned wafer 2.

The supporting elements 14 are swung apart to open the compartment 4 in the regions in which the conveyor 5 is reversed. In said regions, those ends of the supporting elements 14 which are remote from the conveyor chains 10 and from the reversing sprockets 13 are moved a larger distance apart by the moving conveyor chains than those ends of the supporting elements which are close to the conveyor chains 10.

Figure 3A:
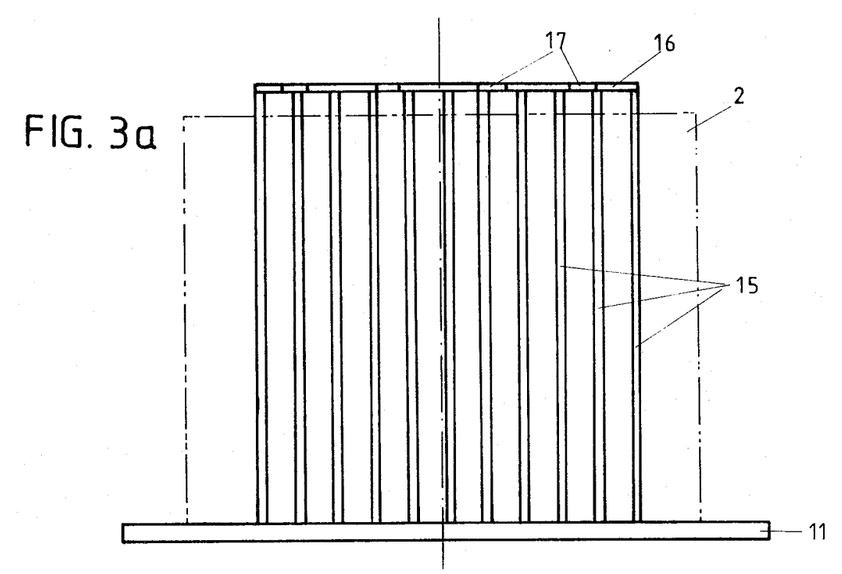
FIGS. 3a, 3b and 3c are, respectively, a front elevation, a side elevation and a top plan view showing a first embodiment of a supporting element.
Figure 3B:
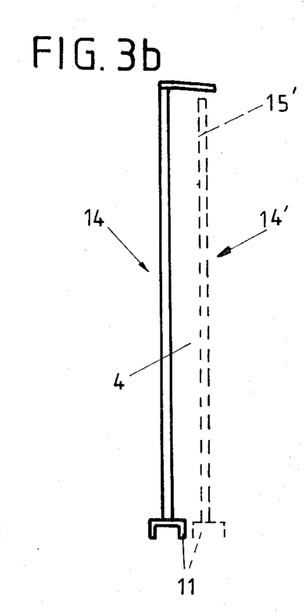
Figure 3C:
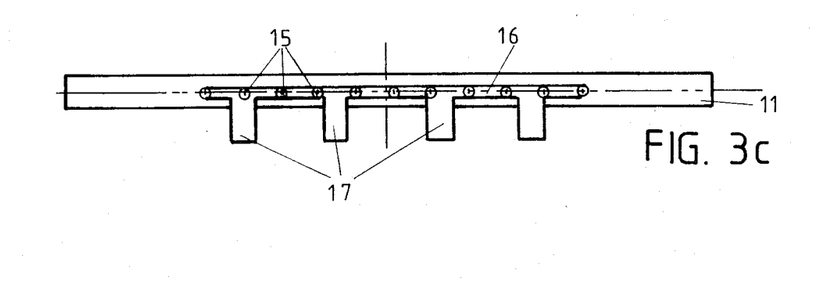

FIGS. 3a to 3c show an illustrative embodiment of a supporting element 14 which is rigidly secured to the carrying element 11. That supporting element 14 consists of a number of spaced apart, parallel rigid rods 15, which are in contact with one side of the wafer 2, which may consist of a wafer sheet or a low hollow wafer. The supporting element 14 defines a compartment 4 on one side. Those ends of the rods 15 which are remote from the carrying element 11 are interconnected by a transverse rod 16. Retaining elements 17 consisting of platelike projections protrude laterally from the transverse rod 16 opposite to the direction of travel. On the other side, the compartment 4 is defined by a supporting element 14', which has somewhat shorter rods 15' and is shown in dotted lines in FIG. 3. When the wafer sheet has a thickness of 2 millimeters, the clearance between the two supporting elements defining a compartment 4 or 4' is about 2 to 4 millimeters. If the large wafer sheets are to be conditioned, that clearance may amount to as much as 10 millimeters so that the extent to which a warping of the wafers is limited by the supporting elements remains approximately the same in relation to the length of the wafer sheet in a direction which is transverse to the direction of travel of the conveyor.

When low hollow wafers are to be conditioned, the clearance between the two supporting elements defining a compartment will be selected in dependence on the distribution of the hollow body portions over the area of the low hollow wafer. If the hollow body portions form rows extending in the direction in which the hollow wafer is introduced into the compartment and said rows are connected by wide, flat webs, which are similar to a wafer sheet, then the clearance between adjacent rods of each supporting element will be selected to be equal to the distance between adjacent ones of said webs. In that case the clearance between the supporting elements will be about 2 to 4 millimeters if the hollow wafer has a wall thickness of, e.g., 2 millimeters. If the hollow body portions of the hollow wafer are so distributed that there are no flat webs extending in the direction in which the wafer is introduced, then the clearance between the supporting elements defining the compartment will be selected to amount to about 10 to 20 mm if the hollow wafer has a height of, e.g., 10 millimeters and a wall thickness of, e.g., 2 millimeters so that one supporting element will contact the hollow body portions when the hollow wafer is warping.

For conditioning wafer sheets or low wafers the clearance between adjacent rods of each supporting element is selected in dependence on the thickness of the wafer and is between 5 times and 40 times, preferably between 10 times and 15 times, the wall thickness of the wafer. In dependence on the size of the wafer sheets said clearance between adjacent rods is between 10 millimeters and 100 millimeters and preferably between 20 millimeters and 37.5 millimeters.

Figure 4A:
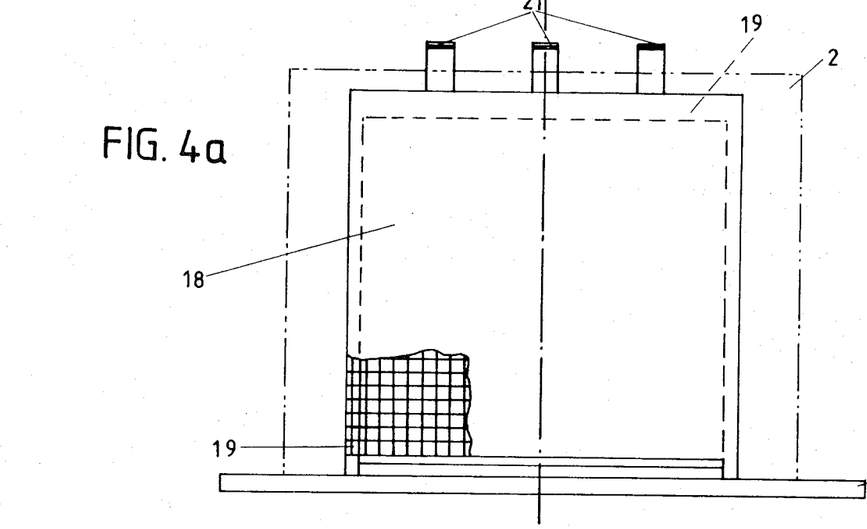
FIGS. 4a, 4b and 4c are, respectively, a front elevation, a side elevation and a top plan view showing two supporting elements combined in a unit.
Figure 4B:
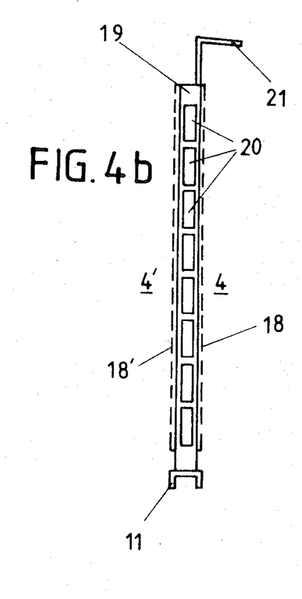
Figure 4C:
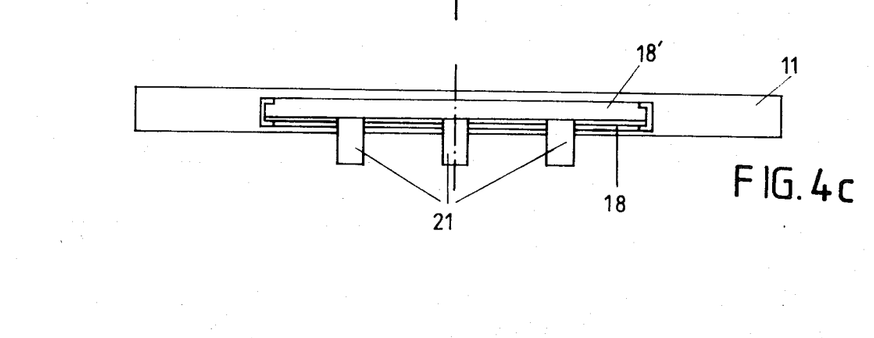

FIGS. 4a to 4c show a carrying element 11 of the conveyor 5. The carrying element 11 carries two supporting elements 18, 18', which with their surfaces that face away from each other are adapted to engage respective wafers 2. Each of the supporting elements 18, 18' defines one of two consecutive compartments 4, 4' for receiving wafers 2. The two supporting elements 18, 18' comprise nets, which extend over the forward and rear sides of a carrying frame 19, which is secured to the carrying element 11. The carrying frame 19 has lateral apertures 20, through which the conditioning air enters the interior of the carrying frame 19 between the adjacent compartments 4, 4'. Three upwardly protruding hooks 21, which are angled oppositely to the direction of travel of the conveyor 5, are secured to the top end of the carrying frame 19. These hooks 21 extend above a wafer 2 which is in contact with the supporting element 18 and define the compartment 4 at its top. The second boundaries of the two adjacent compartments 4, 4' are not shown in FIGS. 4a to 4c and are constituted by similar supporting elements, which are secured to adjacent carrying elements. The second boundary of the compartment 4' is constituted by the supporting element provided on the forward side of the carrying frame that is secured to the next following carrying element. The second boundary of the compartment 4 is constituted by the supporting element provided on the rear side of the carrying frame which is secured to the next preceding carrying element.

In this embodiment of the invention each compartment 4 for receiving a wafer 2 is disposed between two carrying frames 19, which are secured to the carrying elements 11, and the compartments 4 are opened and closed in the regions in which the conveyor is reversed. The hooks 21 prevent the wafers 2 from falling out of the lower course of the conveyor. In this embodiment the clearance between the supporting elements or of the boundaries of a compartment is also equal to once to five times the wall thickness of a flat wafer or to once to twice the height of a low hollow wafer. The net which extends over a given carrying frame 19 has suitably a mesh size between 10 millimeters and 25 millimeters.

Figure 5A:
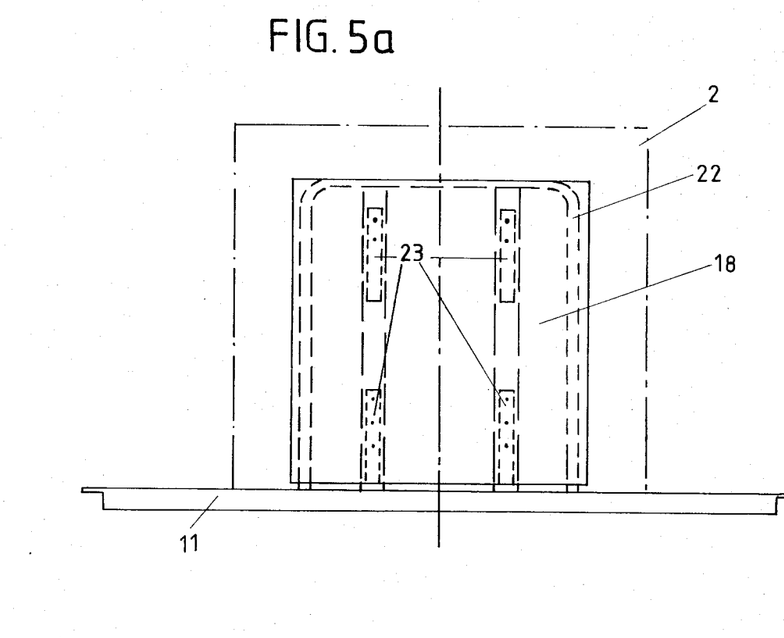
FIGS. 5a and 5b are, respectively, a front elevation and a side elevation showing another embodiment of two supporting elements combined in a unit.
Figure 5B:
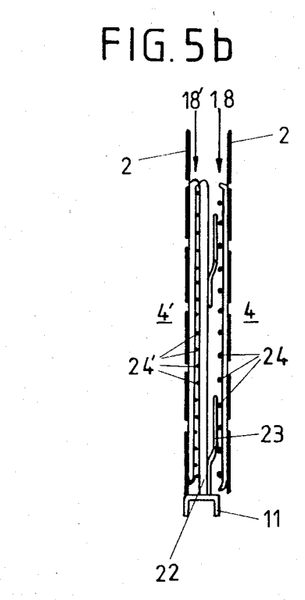

FIGS. 5a and 5b show another embodiment of the compartments 4 provided according to the invention. The two adjacent supporting elements 18, 18' of two consecutive compartments 4 are associated with a carrying element 11, to which one of the two supporting elements 18' is rigidly secured by means of a U-shaped carrying member 22 whereas the other supporting element 18 is resiliently supported on the carrying element 11 by means of springs 23 which are subjected to bending forces. Each of the two supporting elements consists of grid bars 24, which cross each other at right angles, and are in direct contact with the wafers 2, which are shown to consist of wafer sheets. The grid bars 24 are so arranged that those grid bars which are directly contacted by the wafer 2 extend in the direction in which the wafer is introduced into the compartment. The clearance between parallel grid bars which are adjacent to each other is preferably between 10 millimeters and 25 millimeters.

Each compartment 4 is disposed between two consecutive carrying elements. When the compartment is closed, the wafer contained therein is urged by the resiliently supported supporting element 18 against the rigidly secured supporting element 18'. By the pressure exerted by the springs 23, the wafer 2 is held in a plane during the conditioning operation and is retained in the compartment even when the latter is inverted. For this reason there is no need for retaining elements or hooks in this embodiment.

Figure 6A:
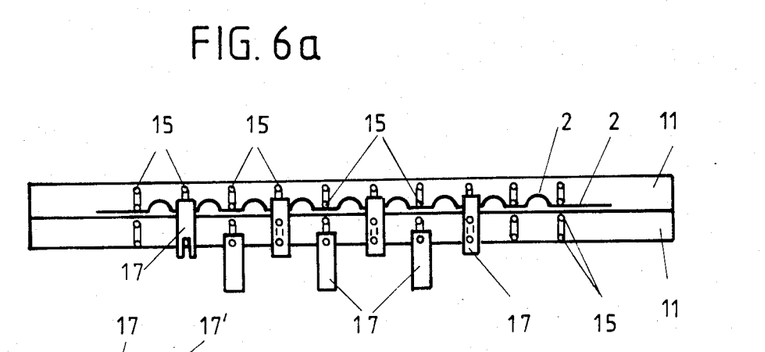
FIGS. 6a and 6b are, respectively, a side elevation and a top plan view showing a compartment which is defined on opposite sides by two supporting elements of another embodiment, which are combined in a unit.
Figure 6B:
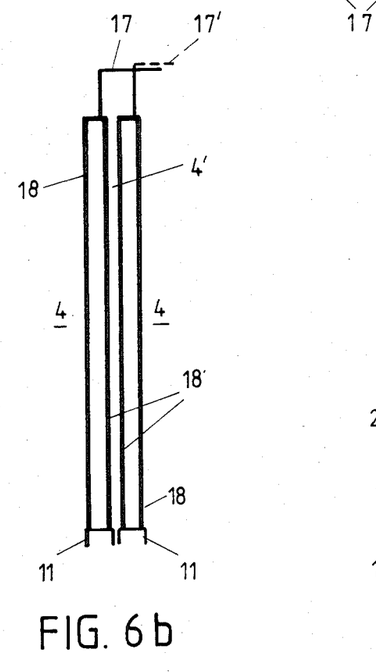

In the illustrative embodiment shown in FIGS. 6a and 6b, each carrying element 11 of the conveyor 5 is disposed between two consecutive compartments 4, 4' or 4', 4 and carries two rows of rods. The rods of each row extend in a plane. The rods of one row constitute a supporting element 18 defining the compartment 4. The rods of the other row constitute a supporting element 18' defining an adjacent compartment 4'. Corresponding rods of the two rows are interconnected to form a U-shaped member. The clearance between adjacent U-shaped members in the longitudinal direction of the carrying element 11, i.e., in a direction which is transverse to the direction of travel of the conveyor, equals the distance between adjacent ones of the flat webs of a hollow wafer which has been received. Some of the U-shaped members carry retaining elements 17, 17', which in a direction that is opposite to the direction of travel extend over the leading one of the supporting elements defining a compartment. The retaining elements 17, 17' of two consecutive carrying elements are connected to the top ends of the respective rows of U-shape members at staggered points. When the compartments 4, 4' are closed, the retaining elements carried by the U-shaped members of one row extend over the adjacent compartment and over the next following compartment.

Figure 7:
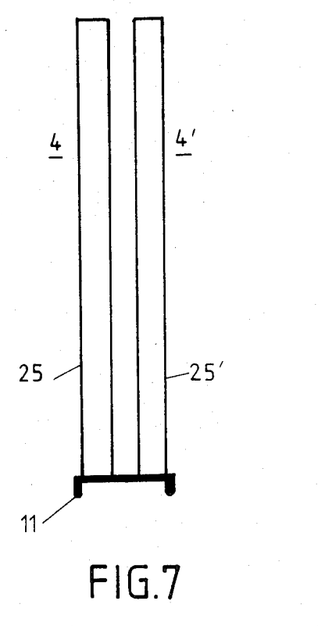
FIG. 7 shows another illustrative embodiment of two supporting elements secured to a carrying element.

To ensure that the clearance between the supporting elements defining a compartment will be uniform throughout the height of the compartment when the latter is closed, one of the U-shaped members is provided with a spacer, which in the illustrative embodiment shown in FIGS. 6a and 6b consists of a notch, which is formed in one retaining element 17 and receives a pin secured to one of the U-shaped members. In the illustrative embodiment shown in FIG. 7, a carrying element 11 carries two rows of U-shaped members 25, 25'. These rows are arranged one behind the other in the direction of travel and extend along the carrying element 11 and are associated with respective compartments. Those legs of the U-shaped members of a row 25 or 25' which adjoin the associated compartment constitute the supporting element which defines the compartment.

Figure 8A:
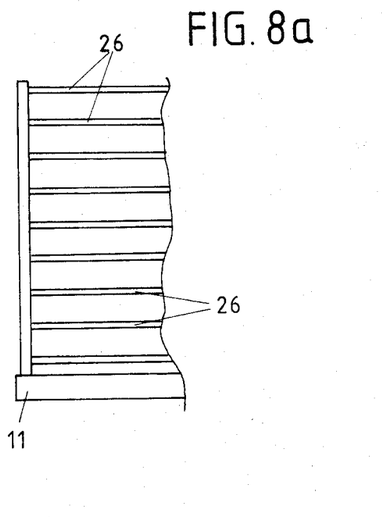
FIGS. 8a and 8b are, respectively, a front elevation and a side elevation showing another supporting element.
Figure 8B:
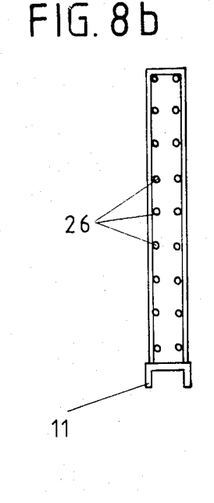

The supporting element shown in FIGS. 8a and 8b comprises carrying rods, which are laterally attached to the carrying element 11 and extend at right angles thereto, and parallel grid rods 26 secured to the carrying rods.

Figure 9:
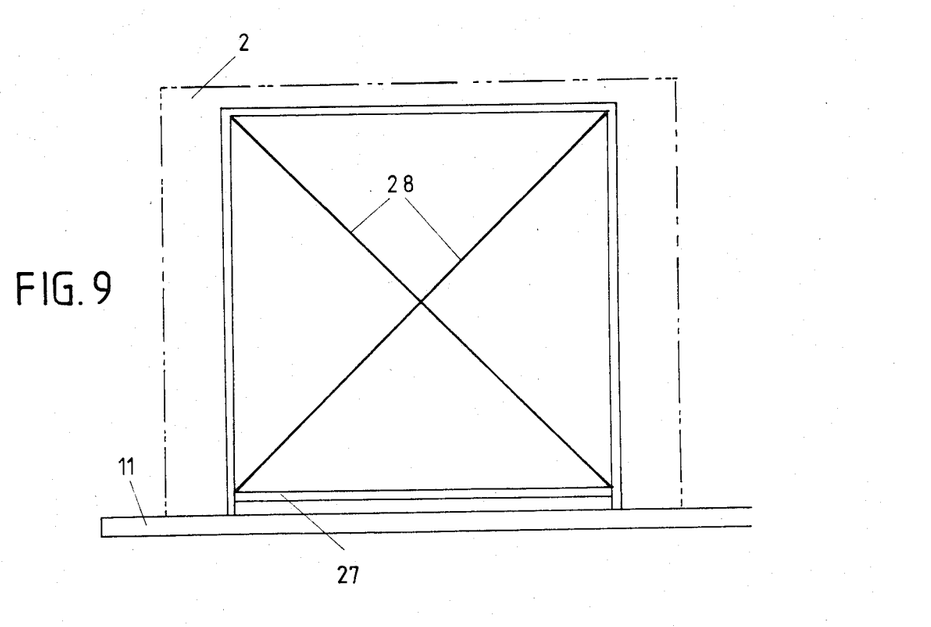
FIG. 9 is a front elevation showing another illustrative embodiment of a supporting element.

The supporting element shown in FIG. 9 comprises a rectangular frame 27, which is secured to the carrying element 11, and two crossing grid wires 28 carried by said frame.

The supporting elements 14, 14', 18, 18' extend over at least 50% of the area of the wafer sheets or the low hollow wafers so that a warping of the wafers is effectively obstructed by the supporting elements throughout the area of the wafers.

What is claimed is:

1. In apparatus for conditioning wafers having an area up to a predetermined area, comprising
   means defining an insulated conditioning chamber and a feed opening and a discharge opening communicating with said conditioning chamber, which is closed except for said feed and discharge openings, a conveyor, which extends in said conditioning chamber and adjacent to said feed and discharge openings and is operable to revolve in a predetermined direction of travel and carries compartment-defining means, which define compartments arranged one behind the other in said direction of travel and adapted to receive respective wafers, and means for delivering conditioning air streams flowing in contact with wafers in said compartments, the improvement residing in that said compartment-defining means comprise for each of said compartments two supporting elements, at least one of which is movable toward and away from the other and which are adapted to support a wafer in said compartment, and the area of each of said supporting elements is at least one-half said predetermined area.

2. The improvement set forth in claim 1 as applied to apparatus in which said means for delivering air streams comprise air passage means extending in said conditioning chamber along said conveyor and adapted to deliver said air streams and an air-conditioning plant disposed outside said conditioning chamber and operable to supply air to said air passage means.

3. The improvement set forth in claim 1, wherein one of said supporting elements defining each of said compartments is hinged to said conveyor.

4. The improvement set forth in claim 1, wherein one of said supporting elements defining each of said compartments is slidable along said conveyor.

5. The improvement set forth in claim 1 as applied to apparatus for conditioning flat wafers, wherein one of the two supporting elements defining each of said compartments is movable toward the other to a position in which the clearance between said two supporting elements is once to five times the wall thickness of the wafers to be conditioned.

6. The improvement set forth in claim 5, wherein one of the two supporting elements defining each of said compartments is movable toward the other to a position in which the clearance between said two supporting elements is 1.1 times to twice the wall thickness of the wafer.

7. The improvement set forth in claim 1 as applied to apparatus for conditioning low hollow wafers, wherein one of the two supporting elements defining each of said compartments is movable toward the other to a position in which the clearance between said two supporting elements is once to twice the height of the wafers to be conditioned.

8. The improvement set forth in claim 1 as applied to apparatus for conditioning wafers having a height up to a predetermined maximum height, wherein at least one of the two supporting elements defining each of said compartments has at least a portion which has a height that exceeds said predetermined maximum height.

9. The improvement set forth in claim 1, wherein the area of each of said supporting elements is at least three-fourths of said predetermined area.

10. The improvement set forth in claim 1, wherein said supporting elements protrude on all sides beyond a wafer contained in said compartment.

11. The improvement set forth in claim 1 as applied to apparatus in which said conveyor comprises a plurality of carrying elements, which are arranged one behind the other in said direction of travel, wherein the two supporting elements defining each of said compartments are mounted on the same carrying element of said conveyor and at least one of said two supporting elements is mounted on said carrying element to be movable relative thereto.

12. The improvement set forth in claim 11, wherein said at least one supporting element is hinged to said carrying element.

13. The improvement set forth in claim 1 as applied to apparatus in which said conveyor comprises a plurality of carrying elements, which are arranged one behind the other in said direction of travel, wherein the two supporting elements defining each of said compartments are mounted on consecutive carrying elements of said conveyor.

14. The improvement set forth in claim 13, as applied to apparatus in which said conveyor has two opposite end portions in which said conveyor is reversed, wherein said supporting elements are rigidly secured to said carrying elements and are arranged to be moved apart and toward each other as they travel around each of said end portions.

15. The improvement set forth in claim 1, wherein at least one of the two supporting elements defining each of said compartments is movable relative to the other between and adapted to be resiliently locked in two positions.

16. The improvement set forth in claim 1, wherein spring means are provided which oppose a movement of one of the two supporting elements defining each of said compartments toward the other.

17. The improvement set forth in claim 1, as applied to apparatus in which said conveyor comprises a plurality of carrying elements, which are arranged one behind the other in said direction of travel, wherein adjacent supporting elements defining two consecutive ones of said compartments are mounted on the same of said carrying elements.

18. The improvement set forth in claim 17, wherein said two adjacent supporting elements are rigidly secured to the same carrying element.

19. The improvement set forth in claim 17, wherein one of said two adjacent supporting elements is rigidly secured to said carrying element and the other of said two adjacent supporting elements is resiliently supported against said one supporting element.

20. The improvement set forth in claim 17, wherein each of said carrying elements on which two adjacent ones of said supporting elements are mounted carries a carrying frame and each of said two adjacent supporting elements is resiliently supported on said carrying frame.

21. The improvement set forth in claim 17, wherein each of said supporting elements comprises a plurality of juxtaposed, spaced apart rods and corresponding ones of said rods of adjacent ones of said supporting elements defining two consecutive ones of said compartments are connected to form U-shaped members.

22. The improvement set forth in claim 17, wherein at least one retaining element is connected to at least one of the two supporting elements defining each of said compartments and is arranged to extend above a wafer contained in the associated compartment and over at least part of the clearance between the supporting elements defining said compartment, and those of said retaining elements which are carried by two of said supporting elements which are mounted on consecutive ones of said carrying elements and define one of said compartments are staggered relative to each other.

23. The improvement set forth in claim 22, wherein each of said retaining elements extends over the compartment defined by the supporting element carrying said retaining element and over at least part of an adjacent one of said compartments.

24. The improvement set forth in claim 1 as applied to apparatus in which said conveyor comprises a plurality of carrying elements, which are arranged one behind the other in said direction of travel, wherein each of said supporting elements comprises a plurality of juxtaposed, spaced apart rods, which are secured to one of said carrying elements.

25. The improvement set forth in claim 24, wherein the rods of each of said supporting elements are disposed in a common place.

26. The improvement set forth in claim 25, wherein adjacent ones of said rods of each of said supporting elements are connected to form a U-shaped member.

27. The improvement set forth in claim 24, wherein
each of said rods constitutes one leg of a U-shaped member and
said U-shaped member has a second leg, which is spaced from said one leg along said conveyor.

28. The improvement set forth in claim 24 as applied to apparatus for conditioning flat wafers, wherein
said rods of each of said supporting elements are parallel to each other and
each clearance between said rods of each of said supporting elements is between five and forty times the wall thickness of the wafers to be conditioned.

29. The improvement set forth in claim 28, wherein each clearance between said rods of each of said supporting elements is 10 to 15 times the wall thickness of the wafers to be conditioned.

30. The improvement set forth in claim 24 as applied to apparatus for conditioning low hollow wafers having a plurality of hollow body portions and a plurality of spaced apart, flat webs connecting said hollow body portions, wherein
each clearance between the rods of each of said supporting elements equals the distance between adjacent ones of said webs.

31. The improvement set forth in claim 1, wherein each of said supporting elements comprises a frame and a grid carried by and extending over said frame.

32. The improvement set forth in claim 31, wherein said frame is rectangular and
said grid comprises at least two crossing wires.

33. The improvement set forth in claim 31, wherein said grid consists of a wire net.

34. The improvement set forth in claim 31, wherein said grid comprises transverse rods, which are secured to said frame and extend parallel to said conveyor and at right angles to said direction of travel.

35. The improvement set forth in claim 34, wherein said grid comprises longitudinal rods, which extend at right angles to said transverse rods and are secured to them on the side facing the associated compartment.

36. The improvement set forth in claim 31, wherein said grid comprises crossing elements, which are joined by welding at their crossings.

37. The improvement set forth in claim 31 as applied to apparatus for conditioning flat wafers, wherein
said grid comprises spaced apart parallel grid elements having a clearance between them which is five to ten times the wall thickness of the wafers to be conditioned.

38. The improvement set forth in claim 1, wherein at least one retaining element is connected to at least one of the two supporting elements defining each of said compartments and is arranged to extend above a wafer contained in the associated compartment and over at least part of the clearance between the supporting elements defining said compartment.

39. The improvement set forth in claim 38 as applied to apparatus for conditioning wafers which are smaller in height than said supporting elements, wherein
said retaining elements are directly mounted on one of the two supporting elements defining each of said compartments.

40. The improvement set forth in claim 38 as applied to apparatus for conditioning wafers which protrude above a major portion of each of said supporting elements, wherein
each of said supporting elements consists of a hook, which protrudes from the associated supporting element.

41. The improvement set forth in claim 38, wherein said retaining elements consist of hooks, which protrude above the leading one of the two supporting elements defining each of said compartments and are angled oppositely to said direction of travel.

42. The improvement set forth in claim 1, wherein
each of said supporting elements has an end portion that is remote from said conveyor and
at least one of the two supporting elements defining each of said compartments comprises spacing means for maintaining a minimum clearance between said end portions of said two supporting elements.

* * * * *